United States Patent [19]
Baller

[11] Patent Number: 5,982,096
[45] Date of Patent: Nov. 9, 1999

[54] DEVICE HAVING A PLURALITY OF IONIZABLE GAS FILLED CHANNEL IN A GAS-TIGHT ENVELOPE, EACH CHANNEL PROVIDED WITH A PAIR OF ELECTRODES

[75] Inventor: Theunis S. Baller, Eindhoven, Netherlands

[73] Assignee: U.S. Philips Corporation, New York, N.Y.

[21] Appl. No.: 08/879,164

[22] Filed: Jun. 19, 1997

[30] Foreign Application Priority Data

Jul. 1, 1996 [EP] European Pat. Off. .............. 96201827

[51] Int. Cl.$^6$ ...................................................... H01J 17/49
[52] U.S. Cl. .......................... 313/582; 313/584; 313/585; 313/586
[58] Field of Search ..................... 313/584, 585, 313/586

[56] References Cited

U.S. PATENT DOCUMENTS 5,705,886  1/1998  Bongaerts et al. ...................... 313/584

FOREIGN PATENT DOCUMENTS

0588486A2  3/1994  European Pat. Off. .

*Primary Examiner*—Sandra O'Shea
*Assistant Examiner*—Ronald E. Delgizzi
*Attorney, Agent, or Firm*—John C. Fox

[57] ABSTRACT

A device, such as a PALC device, has a gas-tight envelope accommodating a number of channels comprising an ionizable gas. Each channel has two electrodes. Adjacent electrodes in different channels are interconnected. Each pair of interconnected electrodes has a lead, which leaves the gas-tight envelope. The pitch between the exits of the leads is larger than the pitch of the channels. In embodiments, the electrodes are grouped together, so that a reduction of the number of leads exiting the gas-tight envelope can be achieved, which enables an (additional) increase in the pitch between the exits of the leads to be attained.

9 Claims, 5 Drawing Sheets

DEVICE HAVING A PLURALITY OF IONIZABLE GAS FILLED CHANNEL IN A GAS-TIGHT ENVELOPE, EACH CHANNEL PROVIDED WITH A PAIR OF ELECTRODES

BACKGROUND OF THE INVENTION

The invention relates to a device having a structure comprising a plurality of adjacent channels in a gas-tight envelope, the channels being filled with an ionizable gaseous medium and each channel comprising at least two electrodes to control ignition of a plasma discharge in the channels, the channels being separated by walls, pairs of said electrodes situated at opposite sides of side walls and electrodes of each of said pairs of electrodes being electrically interconnected and having leads to send electrical signals to the pairs of electrodes.

A device of the above-mentioned type is known from European patent application No. 588 486, in which application an LCD device having an addressing structure of the so-called plasma type is described. Each channel has two electrodes. A number of the electrodes, in the above-mentioned application each of the electrodes, extend through the walls and thus have an exposed surface in the channels on either side of the relevant wall. Thus, in effect, electrodes on opposite sides of a wall are electrically interconnected. Each electrode serves alternately as a cathode and an anode in a channel, depending on the signals supplied to the electrodes via the leads.

Devices of the type described in the opening paragraph are for instance PDPs (Plasma displays) and PALCDs (Plasma Addressed Liquid Crystal Displays). In PDPs the plasma in the channel creates UV-radiation which excites electroluminescent phosphors. In a PALCD the plasma is used to address a liquid crystal.

There is a tendency to decrease the channel-pitch in order to increase the ability to depict small details by means of the device. Within the framework of the invention it has, however, been found that this leads to problems relating in particular to the supply of signals to the leads. Discharges between the leads and cross-talk between the leads can easily occur. Discharges can lead to damage to the leads and cross-talk can lead to unwanted ignition of a channel.

OBJECTS AND SUMMARY OF THE INVENTION

It is an object of the invention to provide a device of the type described in the opening paragraph, in which the above-mentioned problems are reduced.

To this end, the device according to the invention is characterized in that the channels are arranged at a pitch p1, and the pitch between leads of the electrodes, at the locations where said leads leave the gas-tight envelope, amounts to p2, with p2 being greater than p1 (p2>p1).

The invention is based on the recognition that the magnitude of above-noted problems depends to a substantial degree on the strength of the electric fields in the areas where the leads leave the gas-tight enclosure. By increasing the pitch between the leads at the locations where the leads exit the gas-tight enclosure, the field strengths of the electric fields at these locations are reduced thereby reducing such problems as discharges and cross-talk between the leads.

According to a first aspect of the invention, the leads fan out from the ends of the channels towards the location where they leave the gas-tight enclosure. "Fanning out" means in this case that the leads diverge. Devices of the type described herein usually have greater dimensions greater than the channels proper, i.e. the devices have an edge which extends around the channels. This enables the leads to diverge, so that the pitch between the leads is increased. Assuming that the edge increases the dimensions of the device by approximately 10%–15%, the pitch p2 can be increased to 1.1*p1–1.15*p1.

According to a second aspect of the invention, the leads are positioned such that leads for adjacent pairs of electrodes are positioned on opposite sides of the device. In other words, the leads are positioned alternately to the left and the right of the channel. This increases the pitch p2 to 2*p1.

According to a third aspect of the invention, a group of leads are interconnected within the enclosure, the group having one exit lead. As will be shown below it is possible to interconnect the leads inside the device and still have an operational device. Interconnecting the leads inside the device reduces the number of leads which leave the gas-tight enclosure, so that the number of exit leads can be reduced, and hence the pitch p2 between the leads can be increased.

In a preferred embodiment of the third aspect the exit lead for the group of interconnected leads leaves the gas-tight envelope on the side of the device remote from the non-interconnected leads, which non-interconnected leads fan out. To some extent this embodiment is a combination of the first, second and third aspects of the invention.

In a further embodiment the electrodes are sub-divided into a number of divisions of electrodes, each division having a group of internally interconnected electrodes.

These and other aspects of the invention will be apparent from and elucidated with references to the embodiments described hereinafter.

DESCRIPTION OF THE PREFERRED EMBODIMENTS

Figure 1:
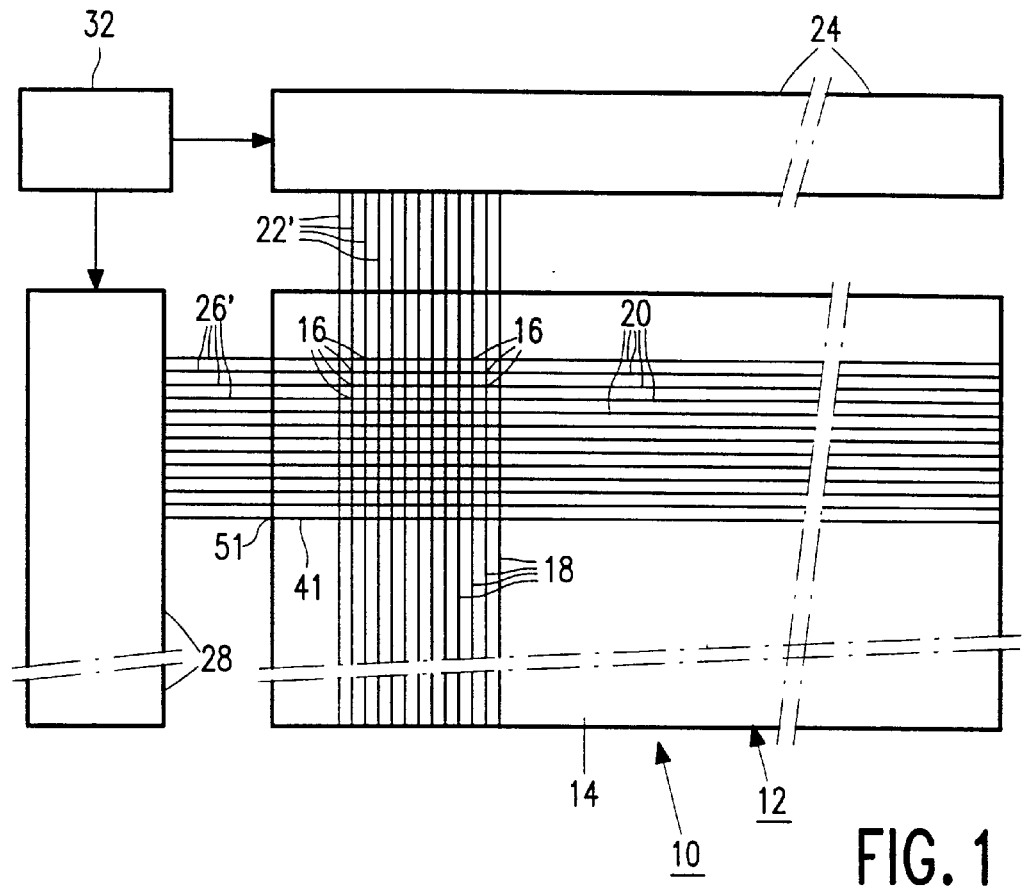
FIG. 1 is a schematic block diagram of a conventional flat-panel display system.

The Figures are not drawn to scale. In general, like reference numerals refer to like parts in the Figures.

FIG. 1 shows a flat-panel display system 10, which represents a typical PALC-display device and the operating electronic circuitry. With reference to FIG. 1, the flat-panel display system comprises a display panel 12 having a display surface 14 that contains a patterned rectangular planar array of nominally identical data storage display elements 16 between which there is a predetermined amount of space in the vertical and horizontal directions. Each display element 16 in the array represents the overlapping portions of thin, narrow electrodes 18 arranged in vertical columns and elongate narrow channels 20 arranged in horizontal rows. (The electrodes 18 are hereinafter sometimes referred to as "column electrodes). The display elements 16 in each of the row of channels represent one line of data.

The widths of column electrodes 18 and channels 20 determine the dimensions of display elements 16, which are typically of rectangular shape. Column electrodes 18 are deposited on a major surface of a first electrically nonconductive, optically transparent substrate 34 (FIG. 2), and the channel rows are usually built into a second transparent substrate 36. Skilled persons will appreciate that certain systems, such as a reflective display of either the direct-view-type or the projection-type, would require only one substrate to be optically transparent.

Column electrodes 18 receive data drive signals developed on output conductors 22' by different ones of output amplifiers 23 (FIG. 2) of a data driver-or drive circuit 24, and channels 20 receive data strobe signals developed on output conductors 26' by different ones of output amplifiers 21 (FIG. 2) of a data strobe circuit 28. Between the channels there are walls 31 and to each side of a wall there are electrodes except on the outer walls of the outer channels, which carry only one electrode. Electrodes on opposite sides of a wall (and thus in adjacent channels) are electrically interconnected.

To synthesize an image on the entire area of the display surface 14, display system 10 employs a scan control circuit 32 that coordinates the function of data drive 24 and data strobe 28 so that all columns of display elements 16 of display panel 12 are addressed row by row, for instance, in a row scanning fashion.

Display panel 12 may employ electro-optical materials of different types. For example, if it uses material that changes the polarization state of incident light rays, display panel 12 is positioned between a pair of light-polarizing filters, which cooperate with display panel 12 to change the luminance of light propagating through them. The use of a scattering liquid-crystal cell as the electro-optical material would not require the use of polarizing filters, however. All materials or layers of materials which attenuate transmitted or reflected light in response to the voltage across them are herein referred to as electro-optic materials. As LC materials presently are the most common example of these materials, the detailed description will refer to LC materials, but it will be understood that the invention is not limited thereto. A colour filter (not shown) may be positioned within display panel 12 to develop multi-coloured images of controllable colour intensity. For a projection display, colour can also be achieved by using three separate monochrome panels 12, each of which controls one primary colour.

Figure 2:
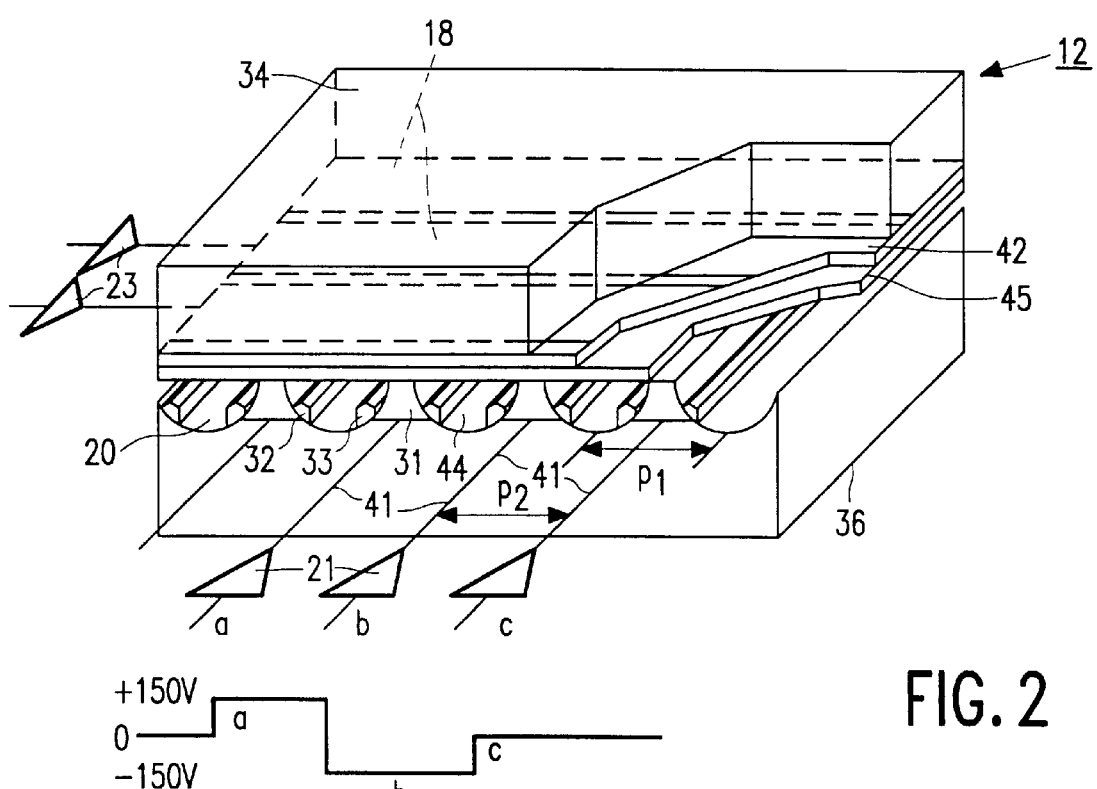
FIG. 2 is a perspective view of a part of a conventional PALC display device.

FIG. 2 illustrates the PALC version of such a flat display panel using LC material. Only 3 of the column electrodes 18 are shown. The row electrodes are constituted by a plurality of parallel elongated sealed channels 20 underlying (FIG. 2) a layer 42 of LC material. Each of the channels 20 is filled with an ionizable gas, sealed with a thin dielectric sheet 45 which is typically made of glass, and contains first and second elongated electrodes 32 and 33 on an inner channel surface. Electrodes on opposite sides of the wall 31 between channels are electrically interconnected. The interconnected electrodes have leads 41 through which pulses are supplied to the electrodes 32, 33. Supplying pulses as shown in FIG. 2 to the interconnected electrodes will ignite channel 44 since the voltage difference between the electrodes in channel 44 is +V−(−V) where V, is for instance 150 Volt=150−(−150)=300 Volt which is enough to form a plasma discharge. In neighbouring channels, the voltage difference is 150 Volt which is not enough to form a plasma discharge. By choosing the proper pulses to be fed to the electrodes, it is possible to form a plasma discharge in only one of the channels. The channels are filled with ionizable gas and thus form a gas-tight envelope. Otherwise, the channels would be contaminated with other gases or gas would leak from the channels). The leads 41 are brought out from the gas-tight envelope. As can be seen in FIG. 1, conventionally the leads are all parallel to each other and to the channels. In such an arrangement the pitch p2 of the leads, i.e. the average distance between adjacent leads measured from the central part of a lead to the central part of an adjacent lead equals the pitch p1 of the channels. At or near positions 51, where the leads 41 leave the gas-tight enclosure, connectors are usually made to connect leads 21 to output conductors (which serve as supply lines) 26'.

Figure 3:
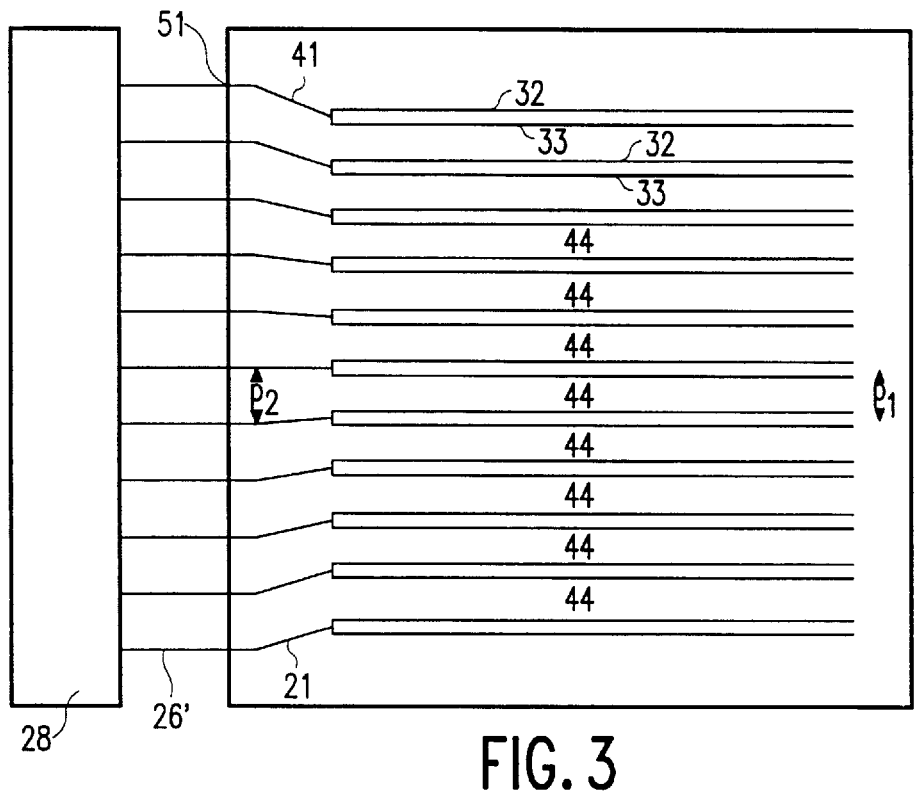
FIG. 3 is top view of the display device in accordance with a first aspect of the invention.

FIG. 3 is a top view of a device in accordance with a first aspect of the invention.

The leads 41 fan out at the end of the channels. This leads to an increase of the pitch p2 of the leads 41 with respect to the pitch p1 of the channels. The increase in distance between the leads reduces the strength of the electric field between the leads, thereby reducing the risk of cross-talk and discharging between the leads. For this reason, the leads extend beyond the total width of the channels.

For example, if pitch p1 is 250 $\mu$m and there are 800 channels the total height of the area of the channels is 20 cm. An edge of 2 cm surrounding the area of the channels enables the pitch p2 to be increased to 300 $\mu$m.

Figure 4:
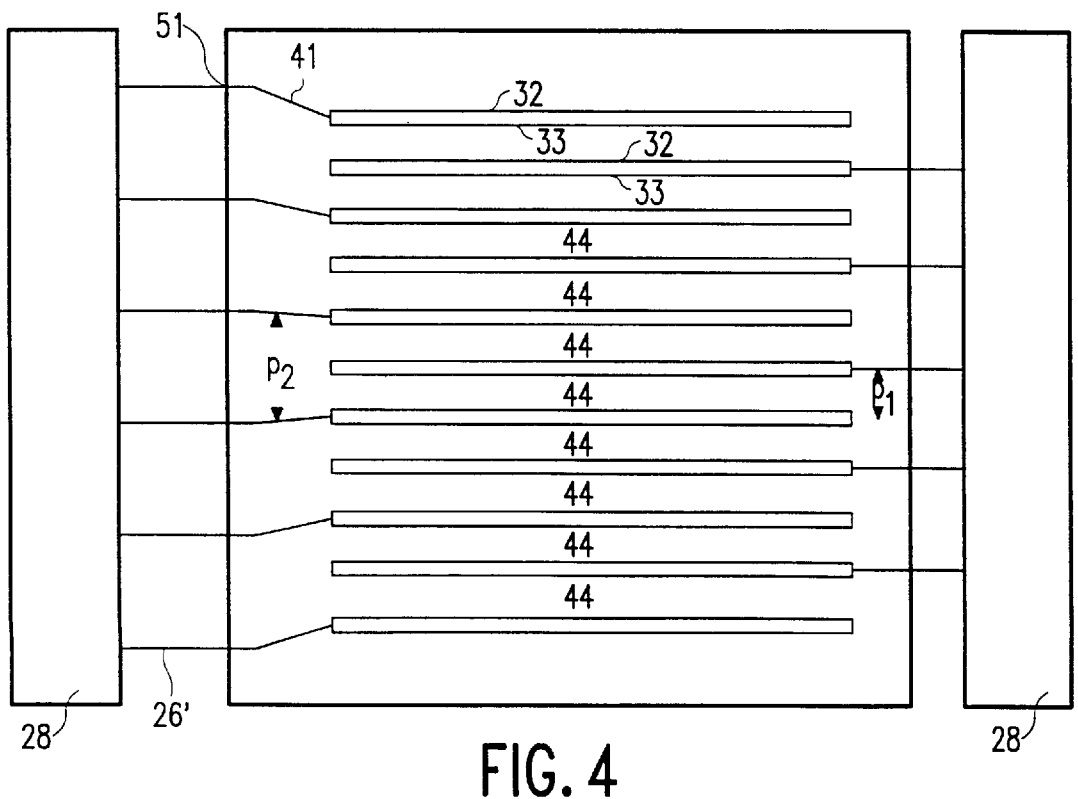
FIG. 4 is a top view of the display device in accordance with a second aspect of the invention.

FIG. 4 is a top view of a device in accordance with a second aspect of the invention. In this embodiment leads are present at both sides of the device and they are alternately situated to the left and the right side of the panel. The distance between the leads, at the position where they leave the gas-tight envelope and at the location of the connections 51, is increased to more than 2*p1, which leads to a further reduction of the problems.

Figure 5A:
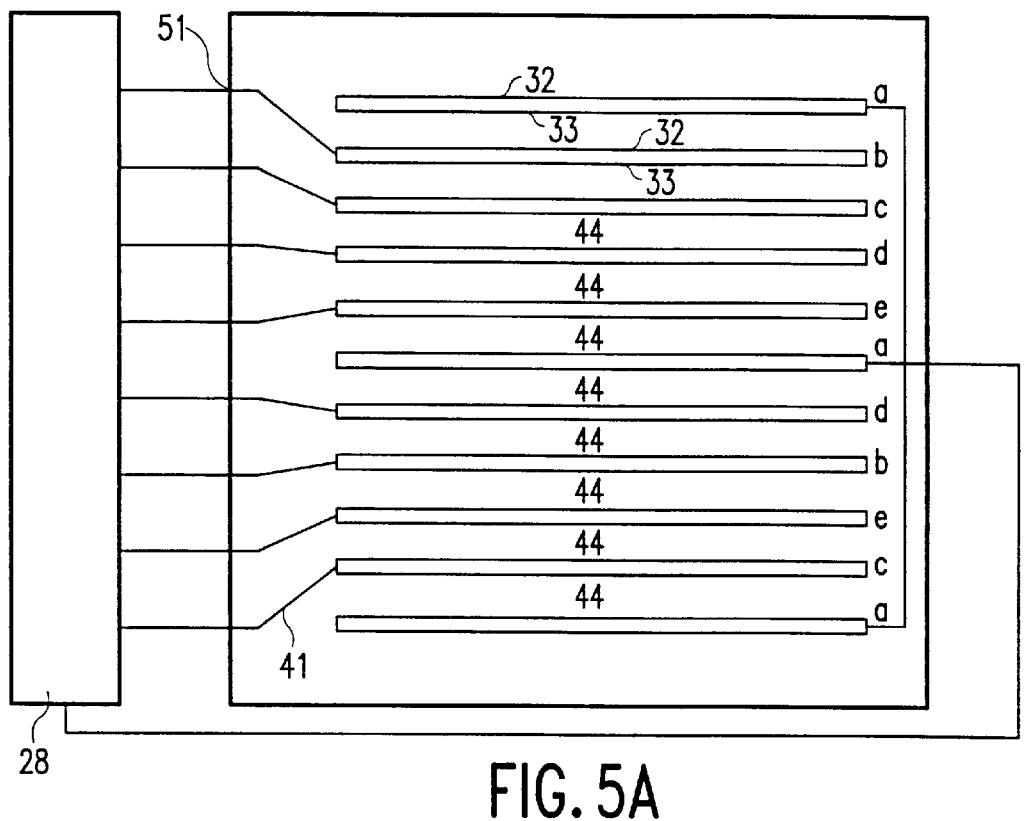
FIGS. 5A and 5B are top views of display devices in accordance with a third aspect of the invention.
Figure 5B:
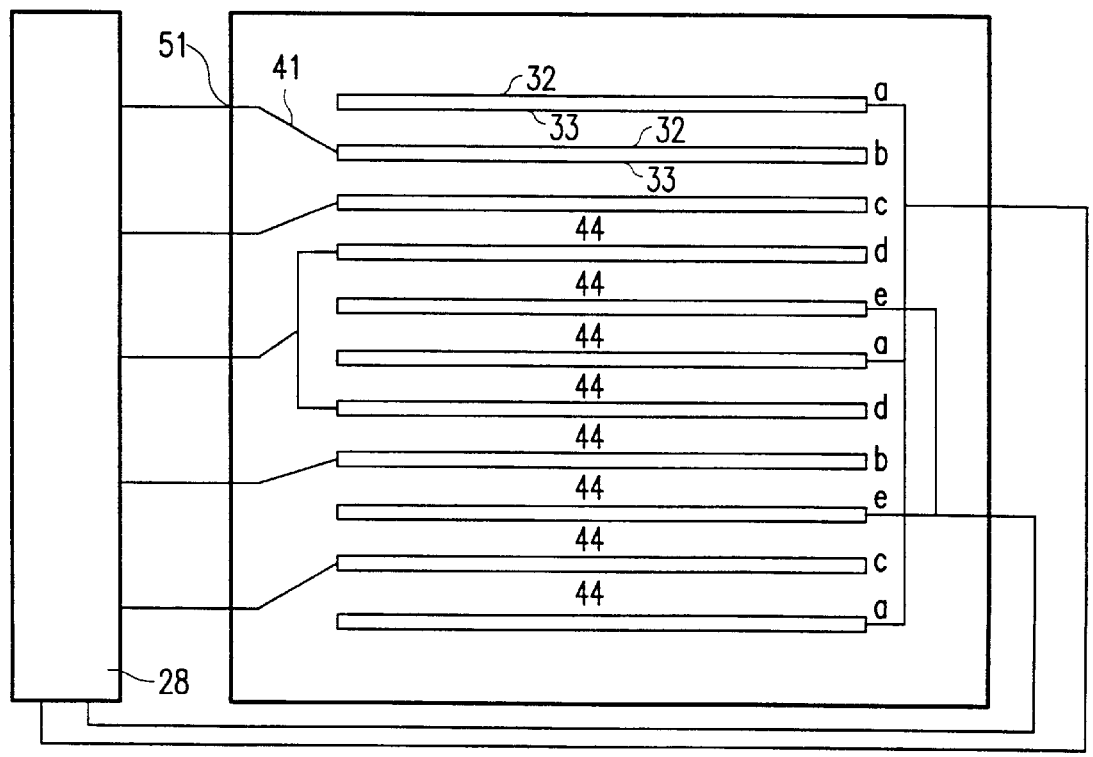
Figure 6:
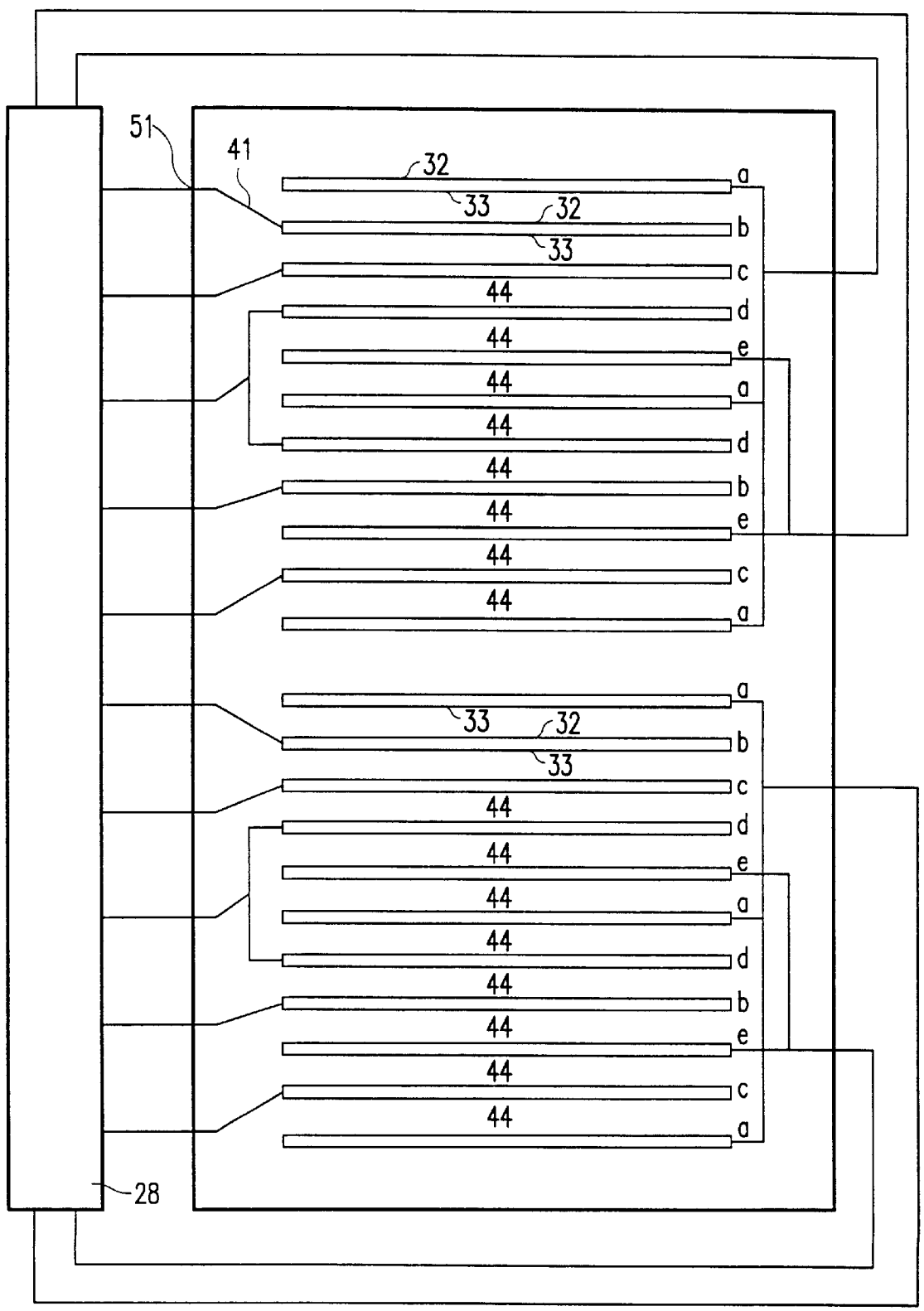
FIGS. 6 and 7 diagrammatically show further embodiments of devices according to the invention.

FIGS. 5A and 5B show in a top view a device in accordance with a third embodiment of the invention. In this embodiment some leads are interconnected in the gas-tight envelope. This is possible because the electrodes can be grouped together. For instance, with five groups of electrodes (a–e) it is possible to control ten channels. With seven groups of electrodes twenty-one channels can be controlled. FIG. 5A shows a device in which five groups of electrodes (a–e) are used to control ten channels. By using a three-voltage driving scheme (e.g. driving each group of leads with voltages +V, 0,−V) and properly selecting the voltages led to the leads a to e, it is possible to form a plasma between neither more nor less than two leads, i.e. in one channel only. For instance, if supply voltages of +150 Volt are applied to group e, −150 Volt are applied to group a and zero Volt is applied to all of the other groups (groups b, c, and d) the one and only channel in which a plasma will be formed is the channel having a lead of group e and of group a. Each group of leads or a number of leads of a group can be interconnected internally (i.e. inside the gas-tight enclosure), on the device 10 but outside the gas-tight enclosure, or outside the device 10, for instance inside the data strobe circuit. In FIG. 5A the leads of group a are internally interconnected at one side of the panel and have one exit lead, while the other groups are not interconnected internally, but in the strobe circuit. It is advantageous to connect at least one group of electrodes internally. Even within the combined width of the channels it is possible to increase substantially the pitch of the leads (by a factor of 10/7). In FIG. 5A the leads fan out, leading to an even larger increase in the pitch of the leads. It is to be noted that in the embodiment shown in FIG. 5A leads need not cross each other in the device, so that any problems that may be caused by such crossings are precluded. In the embodiment of FIG. 5B, the leads in groups a and e (at one side of the device) and a pair of electrodes of group d (at the opposite side of the device) are also internally interconnected. This enables the distance (pitch) between the leads exiting the gas-tight enclosure to be substantially increased, i.e. by a factor of 10/3. It is noted that the idea to group electrodes is in itself advantageous, since it causes the number of groups to become smaller than the number of channels, and it substantially reduces the number of drivers necessary to drive the display. The idea of internally interconnecting electrodes belonging to one group is in itself advantageous since it reduces the number of gas-tight electrical feedthroughs and thus the risk of leaks and it enables the distance between the exit leads to be reduced. In FIGS. 5A and 5B of this fact (strong reduction of the number of connections) is advantageously used to substantially increase the distance between the external leads. Although one group of electrodes is internally interconnected, in FIG. 5A, no leads cross each other internally, which, depending on the circumstances, may be advantageous. In FIG. 5B a limited number of leads cross each other (two crossings), which leads to a further reduction of the number of exit leads (to seven) and makes it possible to further increase the distance between the connections 51 (by a factor of 1.75 with respect to FIG. 5A). It is advantageous if the panel comprises a number of divisions, each comprising a number of groups of electrodes. Such an embodiment is shown in FIG. 6 in which a device having two divisions is shown. The means for supplying voltages can be relatively simple and also, the signals given to the groups of electrodes can be relatively simple, despite a substantial reduction of the number of exit leads, the distance between said leads, and the small number of leads crossing. Preferably every division comprises an odd number of groups, preferably five, seven or nine. Only five groups are needed to control 10 channels, only seven groups are needed to control 21 channels and only nine groups are needed to control 36 channels. The use of an even number of groups does not lead to a substantial increase, as compared to the next lower odd number, of the number of channels that can be controlled, but it does lead to an increase in complexity of the device. Too many groups cause the complexity of the device to increase.

Figure 7:
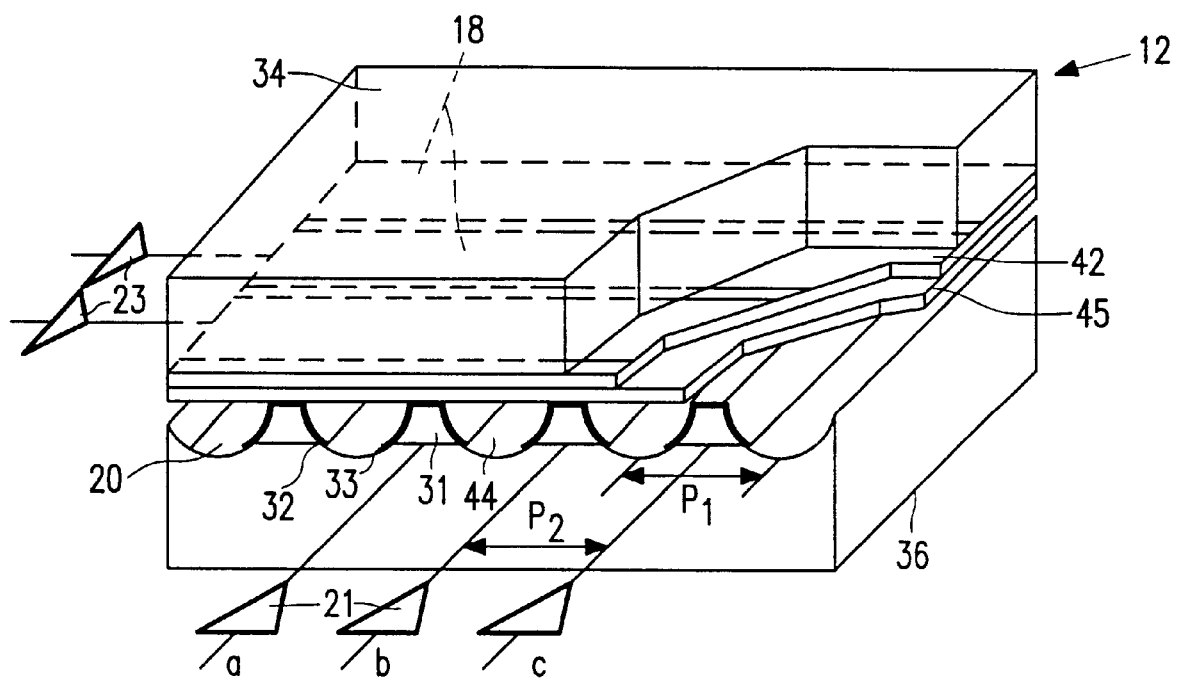

FIG. 7 shows an embodiment in which each pair of electrodes is formed from one large electrode which extends from one channel over the wall separating the channels into an adjacent channel. Such electrodes can be produced in a simple manner in one manufacturing step, e.g. by vacuum evaporation of the electrodes through a mask.

In summary the invention relates to a device, such as a PALC device, which has a gas-tight envelope accommodating a number of channels comprising an ionizable gas. Each channel has two electrodes. Adjacent electrodes in different channels are interconnected. Each pair of interconnected electrodes has a lead, which exits the gas-tight envelope. The pitch between the exits of the leads is larger than the pitch of the channels. In embodiments, the electrodes are grouped together, so that a reduction of the number of leads exiting the gas-tight envelope can be achieved, which enables an (additional) increase in the pitch between the exits of the leads to be attained.

It will be clear that within the framework of the invention many variations are possible.

If the leads 41 are embedded in a solid material, a lead exits the gas-tight envelope at the location where a lead leaves said solid material.

I claim:

1. A device having a structure comprising a plurality of adjacent wall-separated channels in a gas-tight envelope, the channels being filled with an ionizable gaseous medium and each channel comprising at least two electrodes positioned within the channels, for controlling ignition of a plasma discharge in the channel, pairs of said electrodes situated at opposite sides of said walls, each of said pairs of electrodes being electrically interconnected and each of said pairs of electrodes having leads, which exit said gas-tight envelope, to send electrical signals to said pair of electrodes, characterized in that the channels are arranged at a pitch p1, and the pitch p2 between the leads of the electrodes, at the location where said leads exit the gas-tight envelope, is greater than p1.

2. Device as claimed in claim 1, characterized in that the leads fan out from the ends of the channels to the location where they exit the gas-tight envelope.

3. Device as claimed in claim 1, characterized in that leads for adjacent pairs of electrodes are positioned at opposite sides of the device.

4. A device as claimed in claim 1, characterized in that at least one group of leads are interconnected within the enclosure, said group having one exit lead.

5. A device comprising a panel having a structure comprising a plurality of adjacent wall-separated channels in a gas-tight envelope, the channels being filled with an ionizable gaseous medium and each channel comprising at least two electrodes positioned within the channel for controlling ignition of a plasma discharge in the channel, pairs of said electrodes situated at opposite sides of said walls, each of said pairs of electrodes being electrically interconnected and having leads to send electrical signals to said pair of electrodes, and comprising a means to supply voltages to the electrodes, characterized in that the electrodes are electrically interconnected so as to form groups of electrodes, the electrodes in each group being electrically interconnected to each other, the number of groups being smaller than the number of channels, and the means being so arranged that voltages are selectively applied to the groups to selectively form plasma in a channel.

6. Device as claimed in claim 5, characterized in that at least one group of electrodes is electrically interconnected within the gas-tight envelope, said group having one exit lead.

7. Device as claimed in claim 5 characterized in that the panel comprises a number of assemblys, each assembly comprising a number of groups of electrodes.

8. Device as claimed in claim 5, characterized in that the panel or each division of the panel comprises an odd number of groups of electrodes.

9. Device having a structure comprising a plurality of adjacent channels in a gas-tight envelope, the channels being filled with an ionizable gaseous medium and each channel comprising at least two electrodes to control ignition of a plasma discharge in the channel, the channels being separated by walls, and pairs of electrodes situated at opposite sides of said walls being electrically interconnected and having leads to send signals to the pairs of electrodes, characterized in that two adjacent electrodes are formed from one large electrode which extends from one channel over the wall, separating said one channel from an adjacent channel, into said adjacent channel.

* * * * *